United States Patent [19]

Adams et al.

[11] Patent Number: 4,683,757

[45] Date of Patent: Aug. 4, 1987

[54] AXIAL PRESSURE SENSOR

[75] Inventors: Victor J. Adams; Brooks L. Schofield, Jr., both of Tempe, Ariz.

[73] Assignee: Motorola, Inc., Schaumburg, Ill.

[21] Appl. No.: 843,433

[22] Filed: Mar. 24, 1986

[51] Int. Cl.$^4$ .............. G01L 7/08; G01L 9/08; G01L 19/14
[52] U.S. Cl. ...................... 73/756; 73/720; 73/754; 128/675
[58] Field of Search ............ 73/756, 720, 721, 726, 73/727, DIG. 4, 718, 724, 754; 128/675

[56] References Cited

U.S. PATENT DOCUMENTS

| | | | |
|---|---|---|---|
| 3,405,559 | 11/1968 | Moffatt | 73/724 |
| 3,619,742 | 11/1971 | Rud, Jr. | 73/724 |
| 3,808,480 | 4/1974 | Johnston | 73/724 |
| 3,831,588 | 8/1974 | Rindner | 128/675 |
| 3,943,915 | 3/1976 | Severson | 73/724 |
| 4,274,423 | 6/1981 | Mizuno et al. | 73/726 |

FOREIGN PATENT DOCUMENTS 8302952  3/1985  Netherlands ............ 128/671

Primary Examiner—Donald O. Woodiel
Attorney, Agent, or Firm—Robert M. Handy

[57] ABSTRACT

An axially arranged solid state semiconductor pressure sensor assembly is provided in which the semiconductor pressure sensing die is mounted on an internal sub-assembly which is functionally testable and which mates with a variety of different external sleeves individually adapted to attach in different ways to the vessel or system containing the pressure intended to measured. The sub-assembly comprises a cylindrical dielectric body having a platform parallel to the axis of the cylinder. The body contains electrical leads aligned parallel to the platform and extending from the region adjacent to the platform where wire bonds may be made directly to the sensor chip, to the opposite end of the body. A hole and channel arrangement is provided through the dielectric body to the central portion of the platform for communicating the reference pressure to the rear face of the semiconductor die. The sub-assembly is sealed in a metal, plastic or ceramic sleeve which may have a variety of threaded, tapered or bayonet-type mechanisms for attaching to the system containing the pressure to be measured. A boot assembly containing the electrical connections and a means for delivering the reference pressure slips conveniently into or over the opposite end of the sleeve for making connections to the device.

13 Claims, 10 Drawing Figures

AXIAL PRESSURE SENSOR

BACKGROUND OF THE INVENTION

1. Field of the Invention

This invention relates in general to solid state pressure sensors and, more particularly, to pressure sensors which have a relatively long narrow shape.

2. Background Art

Solid state pressure sensors are being employed in a variety of new applications because of their small size and compatibility with other electronic systems. Semiconductor chips or die are generally used as the pressure sensing elements. Because the semiconductor die have a thin flat shape, they have, in the prior art, generally been placed in packages having a similar aspect ratio. However, in many applications where it is desired to use solid state pressure sensors, comparatively flat packages or housings for the sensors are not convenient. Further, prior art solid state pressure sensor packages have generally been custom designed for each mode of attachment to the system containing the pressure being measured. Thus, many different package styles must be handled in manufacturing and in use in order to accommodate the different attachment modes.

Accordingly, it is an object of the present invention to provide an improved axially arranged solid state pressure sensor assembly.

It is a further object of the present invention to provide an improved solid state pressure sensor assembly in which the semiconductor sensor die attaches to a universal internal sub-assembly which will fit within a variety of external or outer housings adapted to connect in different ways to the vessel in which the pressure is being measured.

It is an additional object of the present invention to provide an improved solid state pressure sensor sub-assembly which may be functionally tested prior to being installed in its outer housing.

It is a further object of the present invention to provide an improved axially arranged solid state pressure sensor assembly having the sensed pressure inlet at one end of a cylindrical assembly and the electrical leads and reference pressure inlet at the opposite end of the cylindrical assembly.

It is an additional object of the present invention to provide improved solid state pressure sensor assembly in which the reference pressure inlet connection may be combined with the electrical connections in a common unit.

SUMMARY OF THE INVENTION

The attainment of the foregoing and other objects and advantages is achieved through the present invention wherein there is provided a dielectric body having a substantially cylindrical exterior surface surrounding a central axis, a substantially flat platform at a first end of the body arranged parallel to the central axis, and a second end opposite the first end of the body. Conductive leads are provided extending axially through the body and parallel with the platform so that first ends of the leads protrude from the body adjacent to the platform and second ends protrude from the second end of the body. A channel or hole is provided extending through the body from the second end to an opening located in the platform. The pressure sensor element is mounted on the platform so that the reference pressure region of the sensor element is aligned over the opening.

Bonding wires are provided to connect the active region of the sensor element with the adjacent ends of the conductive leads. The sub-assembly so formed may be conveniently tested by temporarily inserting it in a pressure testing chamber which seals around the cylindrical body and encloses the platform and sensor element mounted thereon.

An external sleeve is provided to surround the cylindrical sub-assembly described above. The external sleeve has a first end for coupling the assembly to the vessel containing the pressure to be measured, and a second end opposite the first end. A cavity extends between the first and second ends of the sleeve for receiving the body with the sensor mounted thereon. The sleeve and the body are conveniently sealed together so that the external leads protruding from the body are accessible at the second end of the sleave.

Electrical connections to the sensor are conveniently made by a cable and connector arrangement which contacts the external leads. A feature of the present invention is that the reference pressure inlet to the sensor element is provided at substantially the same location as the external leads to the sensing element so that, if desired, a reference pressure inlet tube may be provided as a part of the external electrical connector assembly. An elastomeric boot containing the electrical connections and reference pressure inlet tube is conveniently inserted in or slipped over the second end of the sleave.

A feature of the present invention is that the same body, platform, lead and sensor arrangement may be used with a variety of different external sleeves adapted to connect in a variety of different ways to the pressure being measured. This arrangement substantially reduces manufacturing and parts inventory costs.

The details of the present invention are more completely understood in terms of the drawings and description which follow.

DETAILED DESCRIPTION OF THE DRAWINGS

Figure 1:
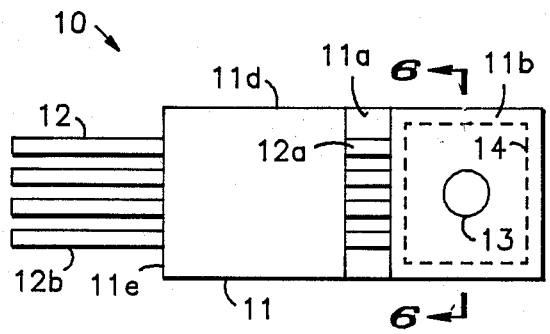
FIG. 1 shows in simplified schematic form a top view of an internal sub-assembly of an axially arranged solid state pressure sensor according to the present invention.
Figure 2:
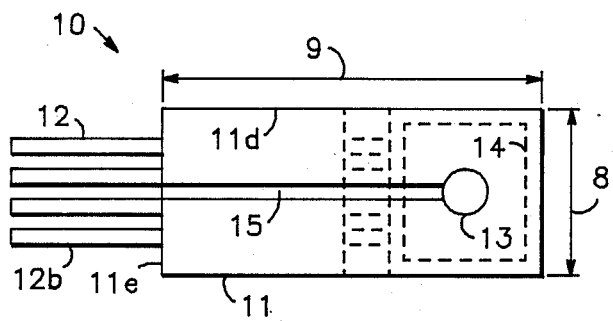
FIG. 2 shows a bottom view of the structure of FIG. 1.
Figure 3:
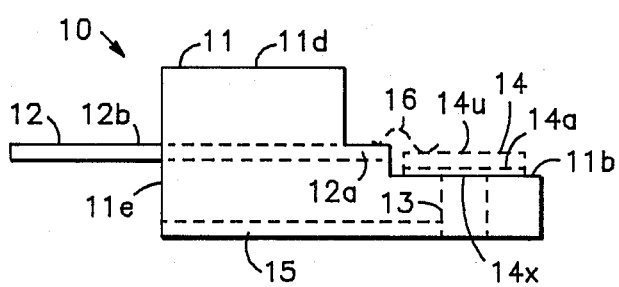
FIG. 3 shows a side view of the structure of FIG. 1.
Figure 4:
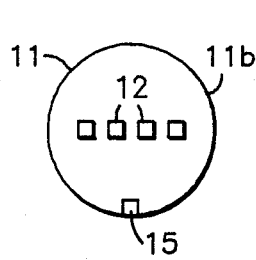
FIGS. 4 and 5 show, respectively, left and right side elevation views of the structure of FIG. 1.
Figure 5:
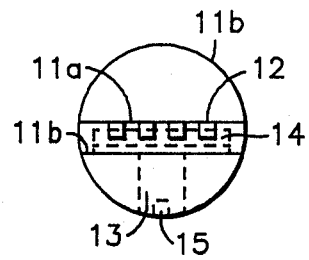
Figure 6:
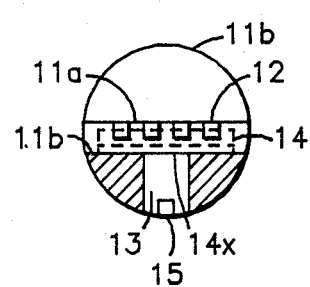
FIG. 6 shows in simplified and schematic form a partial cross-sectional view of the structure of FIG. 1.

For purposes of explanation, the pressure sensor assembly and structures described herein are illustrated for a semiconductor solid state sensing element. However, those of skill in the art will understand that other solid state sensing elements having a region for sensing a pressure to be measured on a first surface and a region for sensing a reference pressure on a second surface, opposite said first surface, may equally well be used.

FIGS. 1-6 show, respectively, a top view, bottom view, front view, left side view, right side view, and partial cross-sectional view of pressure sensor sub-assembly 10 comprising body 11 of generally cylindrical shape, having platform 11b on which is to be mounted solid state pressure sensor element or chip 14. Conductor leads 12 extend axially through body 11 from first end 11e to second region 11a adjacent platform 11b. Portions 12a of leads 12 are exposed in region 11a to permit connections to sensor chip 14 by means of wires or interconnections 16. Portions 12b of leads 12 extend from end 11e of body 11 to provide for external connection to sub-assembly 10.

Body 11 contains opening or hole 13 located under sensor chip 14. Opening 13 communicates with location 14x on sensor chip 14 adapted to receive the reference pressure. Channel 15 is conveniently provided in body 11 for coupling hole 13 to rear face 11e of body 11. Surface 11d of body 11 conveniently has a circular cylindrical shape, however, other polygonal cross-sectional shapes may also be used. As employed herein, the word "cylindrical" is intended to include structures having cross-sections which may be circular or any convenient polygonal shape. Typical dimensions of sub-assembly 10 having silicon pressure sensor die 14 measuring 3.3 by 3.3 mm are, diameter 8 of about 5.3 mm and length 9 of about 12.1 mm. Larger or smaller dimensions may also be used consistent with the desired elongated shape, the chip size, and the size of the external sleeve in which sub-assembly 10 is to be mounted. Sub-assembly 10 may be conveniently formed by injection molding of plastic body 11 on a lead frame containing leads 12. Such techniques are well known in the art. Other fabrication techniques may also be used.

Sensor element 14 is bonded to platform 11b by bonding means 14a. For best performance, bonding means 14a should be limited in lateral extent so as to not block access between opening 13 and region 14x on lower face of sensor element 14 intended to receive the reference pressure. The pressure to be measured is applied to upper surface 14u of sensor element 14. A die coat (not shown) may be applied to upper surface 14u of sensor element 14 if desired.

Sub-assembly 10 containing sensor element 14 may be readily tested by inserting the unit in a controlled pressure chamber which encloses sensor element 14 and which seals against outer surface 11d of body 11. Where surface 11d has a circular cylindrical shape, this is conveniently accomplished by inserting sub-assembly 10 in a tight fitting O-ring, piece of tubing, or similar arrangement whose bore communicates with a controlled pressure region. Electrical connections are made to leads 12. The pressure within the bore or tubing may be varied in order to calibrate and test the sub-assembly. If desired, testing may be performed in the same ambient fluid or gas and over the same pressure range which the sub-assembly will encounter in its intended use.

Sub-assembly 10 is then fitted into an external barrel or sleeve adapted to conveniently mate with the source of pressure intended to be measured. The same internal sub-assembly 10 may be used with a variety of different external sleeves. Several different arrangements are illustrated FIGS. 7-10.

Figure 7:
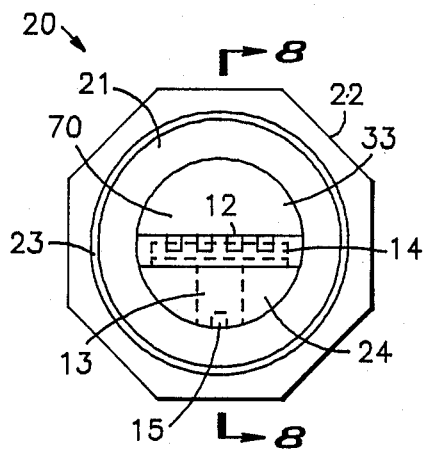
FIG. 7 shows in simplified schematic form, an end view of the sub-assembly of FIG. 1 when inserted in an external sleeve.
Figure 9:
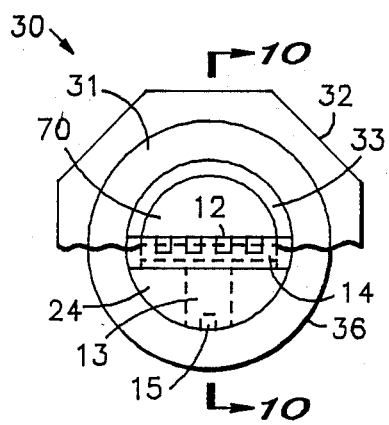
FIG. 9 shows a simplified schematic view, similar to FIG. 7, but according to further embodiments of the present invention.
Figure 8:
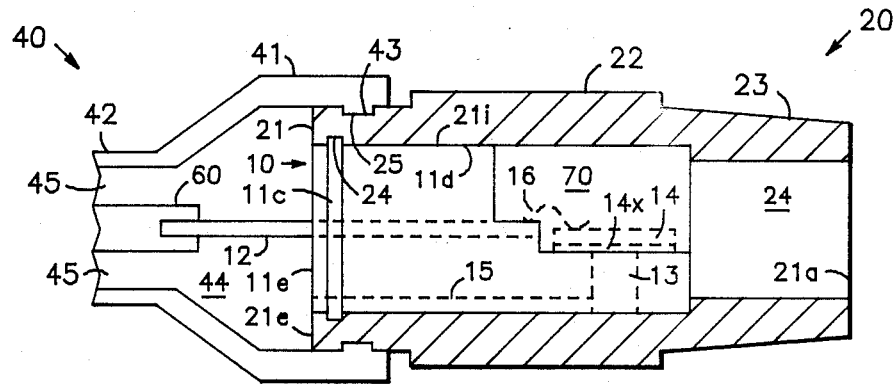
FIG. 8 shows a simplified schematic cross-sectional view of the structure of FIG. 7, further including, an electrical connector and reference pressure inlet means.
Figure 10:
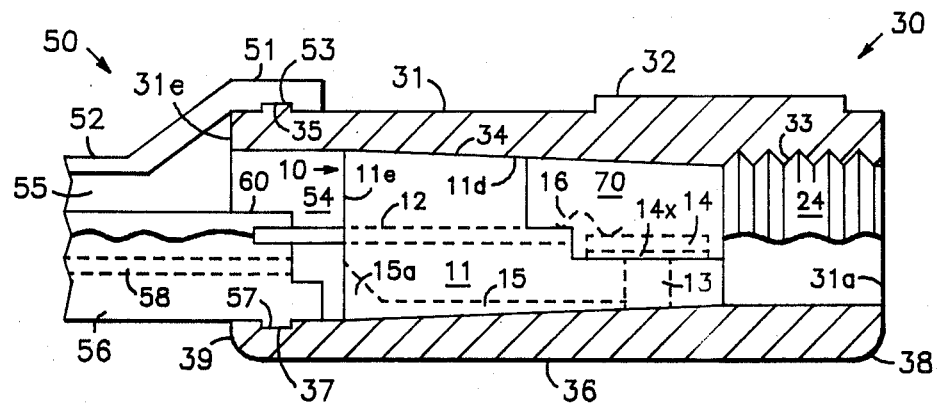
FIG. 10 shows a simplified schematic cross-sectional view of the structure of FIG. 9, similar to that of FIG. 8, and according to several embodiments of the present invention, and further including an electrical connection and reference pressure inlet means.

FIGS. 7 and 9 show end views looking towards pressure sensing element 14 of sub-assembly 10 after sub-assembly 10 has been inserted in an external sleeve to provide complete pressure sensor assemblies 20, 30. FIGS. 8 and 10 show cross-sectional views through assemblies 20 and 30 respectively, and further include electrical connection and reference pressure delivery means 40 and 50.

Considering first FIGS. 7 and 8, sub-assembly 10 is inserted in external sleeve 21 having hexagonal outer portion 22 and tapered outer portion 23. Hexagonal portion 22 is provided as a convenient means of holding sleeve 21 during connection to the vessel containing the pressure intended to be measured. Tapered portion 23 illustrates one of many possible arrangements for mating sleeve 21 to the pressure intended to be measured. In this case, tapered surface 23 is conveniently adapted for attachment to hypodermic needle-like arrangements. Sleeve 21 has an internal cavity for accepting sub-assembly 10, including cavity portion 70 surrounding sensor 14 which communicates with cavity portion 24 which is intended to be exposed at end 21a to the pressure to be measured.

It is important that outer surface 11d of sub-assembly 10 seal against inner surface 21i of sleeve 21 so that there is substantially no communication of the fluid or gas whose pressure is intended to be measured between ends 21a and 21e of sleeve 21 and assembly 20. Any convenient sealing means may be used, including adhesives, heat sealing, and/or gaskets. For example, FIG. 8 illustrates an embodiment in which body 11 contains ridge or gasket 11c which mates with groove 24 in body 21. By forming body 11 of a slightly elastic material or by placing a slightly elastic material in location 11c, sub-assembly 10 may be snapped into sleeve 21 so that ridge or gasket 11c tightly engages groove 24. Other variations are also possible.

FIG. 8 also illustrates in simplified schematic form connector assembly 40 comprising hollow boot 41 and tube 42, and containing electrical connector 60 for making electrical connection to leads 12. Boot 41, as shown in FIG. 8, slips over end 21e of sleeve 21 so as to provide a substantially gas and/or liquid tight seal thereto. Boot 41 creates cavity 44 adjacent end 21e of sleeve 21 and end 11e of body 11. Cavity 44 communicates by means of opening 15 and hole 13 with reference pressure region 14x on pressure sensor 14. Passageway 45 may be provided within tube 42 for communicating the reference pressure from a remote location to cavity 44 and thence to region 14x of sensor 14. Alternatively, an opening or vent (not shown) may be provided anywhere in boot 41 or tube 42 at the location that is desired to be the source of the reference pressure. For simplicity, assembly 40 and boot 41 have been omitted from FIG. 7. In order to ensure that boot 41 fits snugly around sleeve 21 and is retained in place, it is convenient to provide protrusion 43 on boot 41 which engages matching notch 25 in sleeve 21 or equivalent (see FIG. 8).

FIGS. 9 and 10 show, respectively, a simplified end view and partial cross-sectional view of the present invention according to further embodiments. In FIG.

10, sub-assembly 10 is illustrated as having body 11 in which outer surface 11d is a smoothly tapered circular cylinder. FIG. 10 also illustrates the situation where channel or groove 15 has enlarged region 15a adjacent end 11e of body 11. In other respects, sub-assembly 10 in FIG. 10 is substantially the same as illustrated in FIGS. 1-6. FIGS. 9 and 10 illustrate two further embodiments of sleeve 31 and connector assembly 50. Sub-assembly 10 is substantially the same in both embodiments.

FIGS. 9 and 10 show in their upper half a first embodiment of assembly 30 in which sleeve 31 has hexagonal portion 32 in much the same manner as sleeve 21, and internal threaded portion 33 for convenient attachment to the vessel containing the pressure to be measured. Tapered interior surface 34 of sleeve 31 is adapted to mate with tapered exterior surface 11d of sub-assembly 10 (see FIG. 10).

The lower portions of FIGS. 9 and 10 illustrate the situation in which sleeve 31 has smooth outer surface 36 with rounded corners 38-39. In the lower half of FIGS. 9-10 screw threads 33 and hexagonal exterior portion 32 have been omitted. The construction illustrated in the lower half of FIGS. 9-10 is particularly convenient when it is desired to have an axial pressure sensor which may be easily inserted in confined spaces, as for example, in biomedical or similar applications where the pressure sensor must be inserted in a long catherter or tube.

Those of skill in the art will understand that the external configuration of sleeves 21, 31 may have many different shapes suited for attachment to a variety of different vessels containing the pressure to be measured. Further, those of skill in the art will understand that cavity portion 24 of the interior bore of sleeves 21, 31 may or may not be threaded or may have varying diameters depending upon the particular application desired. It is only necessary that cavity portion 24 provide communication for the pressure to be measured between ends 21a, 31a of sleeves 21, 31 and cavity portion 70 surrounding sensor 14.

FIG. 10 also illustrates further embodiments of connector 50 in the upper and lower halves. In the upper half of FIG. 10, connector 50 comprising boot portion 51 and tube 52 is substantially similar to connector 40 shown in FIG. 8 except that ridge 35 and groove 53 in sleeve 31 and boot 51 are oppositely arranged, as compared to FIG. 8. Further, FIG. 10 illustrates the variation in which sleeve 31 has end 31e extending beyond rear face 11e of body 11 so as to provide a recess at the rear end of assembly 30 for protecting leads 12.

The lower half of FIG. 10 illustrates a further embodiment in which connector assembly 50 is designed to fit inside rather than over sleeve 31. In this embodiment, portion 56 of connector 50 is sized so as to slide inside end 31e of sleeve 31. Ridge 57 and notch 37 are provided in assembly 50 and sleeve 31 so that portion 56 is retained and seals tightly against sleeve 31. Cavity 54 is provided at end 11e of body 11 for communicating with hole 13 and channel 15-15a for introducing reference pressure to portion 14x of sensor 14. In the upper half of FIG. 10, channel 55 in tube 52 conveniently communicates the reference pressure to cavity 54. In the lower half of FIG. 10 hole or tube 58 within portion 56 conveniently provides the means for communicating the reference pressure to cavity 54. However, other means for delivering the reference pressure to cavity 54 may also be used. Typical overall dimensions for sleeves 21, 31 are a diameter of about 7.0 to 10 mm and length of about 12 to 15 mm. Different overall dimensions may also be used, consistent with the size of body 10 and the desired application. Sleeves 21, 31 are conveniently fabricated of plastic, metal, or ceramic.

It will be appreciated by those of skill in the art, that the structure described above provides a particularly convenient pressure sensor assembly. The structure has a relatively small size and is axially arranged. The pressure to be measured is introduced at a first end of the axial sensor. A multiplicity of different external sleeves adapted to mate with a variety of different unknown pressure arrangements may be used in connection with a common internal sub-assembly carrying the pressure sensor itself. The electrical connections and reference pressure inlet means are provided together at a common end of the axially arranged assembly opposite to the unknown pressure inlet. This arrangement makes it possible to provide electrical connection and reference pressure input using a common connector assembly which fits snuggly over or into the external sleeve and which is independent of the internal sub-assembly. The reference pressure may be fed to the reference pressure inlet via a tube contained within the connector assembly, by a coaxial arrangement surrounding the electrical leads, or by other convenient means.

The invented arrangement provides a particularly compact, slender pressure sensor assembly with interchangeable parts. Those of skill in the art will understand that the internal sub-assembly may have a variety of different external shapes intended to mate with the internal shape of the external sleeve. Those of skill in the art will also understand that the external sleeve may have a variety different means for attaching to the system containing the pressure to be measured. It will be further apparent to those of skill in the art that the arrangement of the present invention provides a structure which uses a common internal sub-assembly which may be manufactured in high volume and at low cost because of the uniformity of its shape and piece parts, and further provides a sub-assembly which may be functionally tested prior to final assembly. These advantages make it possible to serve a variety of different end user needs more conveniently and less expensively than in the prior art. Additionally, those of skill in the art will understand that the principles taught herein apply to other variations in the detailed design of both the internal sub-assembly and the external sleeve. Accordingly, it is intended to include all such variations in the claims which follow.

We claim:

1. An axially arranged pressure sensor assembly comprising:
   a dielectric body member having an exterior surface including a platform for supporting a solid state sensor element wherein said platform is parallel to an axis of said body member and wherein said body member is substantially cylindrical and said axis corresponds to the longitudinal axis of said cylinder;
   conductive leads in said body member with first portions protruding from a first end of said body member transverse to said platform, for making external electrical connections to said sensor assembly, and second ends exposed at a second portion of said body member opposite said first end, for accepting connections from said sensor element;
   reference pressure inlet means in said body member, running between a first opening in said platform at the location of said sensor element, and a second opening in said first end; and barrel means having a first axially open end for coupling to a source of pressure to be measured, a second axially open end opposite said first end, and a cavity extending between said first and second ends, wherein said body portion is sealably located in a first part of said cavity adjacent said second end of said barrel means and with said first end of said body portion oriented toward said second end of said barrel means, and wherein a second part of said cavity surrounds said platform and communicates with said first end of said barrel means.

2. The assembly of claim 1 wherein a portion of said exterior surface between said second end and said first end of said body member tapers toward said first end of said body member and wherein a portion of said cavity of said barrel means has a substantially matching taper.

3. The assembly of claim 1 further comprising a solid state pressure sensing element bonded to said platform by a first face and having a part of said first face corresponding to a reference pressure application region of said sensor located over said first opening.

4. The assembly of claim 1 further comprising reference pressure connection means sealably engaging said second end of said barrel means and enclosing said second opening.

5. The assembly of claim 4 further comprising demountable electrical connection means engaging said first portions of said conductive leads and located within said reference pressure connection means.

6. A pressure sensor assembly comprising:

a dielectric body member having a substantially cylindrical exterior surface surrounding a central axis, a substantially flat platform at a first end of said body member, wherein said platform is parallel to said central axis of said body member, and a second end opposite said first end and wherein said body member has an outer diameter at said second end;

conductive leads extending axially through said body member, aligned parallel with said platform, and having at least first ends protruding from said body member adjacent said platform and second ends protruding from said second end of said body member;

a pressure sensor element mounted on said platform, and having a first region for receiving a pressure to be measured and a second region on a face opposite said first region for receiving a reference pressure;

reference pressure inlet means in said body member, running between a first opening located in said platform beneath said second region of said pressure sensor element, and a second opening in said second end of said body member; and an external sleeve surrounding said cylindrical exterior surface of said body member and having a first open end facing substantially perpendicular to said central axis for coupling to said pressure to be measured and a second open end facing substantially perpendicular to said central axis and opposite said first end, and a cavity extending between said first and second ends of said sleeve for receiving said body member with said second ends of said leads oriented toward said second end of said sleeve, and wherein a portion of said cavity extends from said sensor element on said platform to said first end and wherein said portion of said cavity has an interior diameter smaller than said outer diameter of said body member.

7. The assembly of claim 6 further comprising retention means located on an interior surface of said sleeve and in contact with said body member for retaining said body member in said sleeve.

8. A pressure sensor assembly comprising:

a dielectric body member having a substantially cylindrical exterior surface surrounding a central axis, a substantially flat platform at a first end of said body member, wherein said platform is parallel to said central axis of said body member, and a second end opposite said first end;

conductive leads extending axially through said body member, aligned parallel with said platform, and having at least first ends protruding from said body member adjacent said platform and second ends protruding from said second end of said body member;

a pressure sensor element mounted on said platform, and having a first region for receiving a pressure to be measured and a second region on a face opposite said first region for receiving a reference pressure;

reference pressure inlet means in said body member, running between a first opening located in said platform beneath said second region of said pressure sensor element, and a second opening in said second end of said body member;

an external sleeve surround said cylindrical exterior surface of said body member and having a first end for coupling to said pressure to be measured and a second end opposite said first end, and a cavity extending between said first and second ends of said sleeve for receiving said body member with said second ends of said leads oriented toward said second end of said sleeve, and wherein a portion of said cavity extends from said sensor element on said platform to said first end; and reference pressure delivery means slideably engaging said second end of said sleeve and enclosing said second opening.

9. The assembly of claim 8 further comprising electrical connection means for engaging said second ends of said leads.

10. The assembly of claim 9 wherein said electrical connection means is located at least partially within said reference pressure delivery means.

11. The assembly of claim 8 wherein and said reference pressure delivery means is formed of an elastic material which engages said sleeve at said second end of said sleeve.

12. The assembly of claim 11 wherein said sleeve and said reference pressure delivery means contain one or more matching retention ridges and grooves in the portion wherein they engage.

13. A pressure sensor assembly comprising:

a dielectric body member having a substantially cylindrical exterior surface surrounding a central axis, a substantially flat platform at a first end of said body member, wherein said platform is parallel to said central axis of said body member, and a second end opposite said first end;

conductive leads extending axially through said body member, aligned parallel with said platform, and having at least first ends protruding from said body member adjacent said platform and second ends protruding from said second end of said body member;

a pressure sensor element mounted on said platform, and having a first region for receiving a pressure to be measured and a second region on a face opposite said first region for receiving a reference pressure;

reference pressure inlet means in said body member, running between a first opening located in said platform beneath said second region of said pressure sensor element, and a second opening in said second end of said body member;

an external sleeve surround said cylindrical exterior surface of said body member and having a first end for coupling to said pressure to be measured and a second end opposite said first end, and a cavity extending between said first and second ends of said sleeve for receiving said body member with said second ends of said leads oriented toward said second end of said sleeve, and wherein a portion of said cavity extends from said sensor element on said platform to said first end; and wherein said external surface of said body means and an internal surface of said sleeve for engaging said body means are tapered.

* * * * *